United States Patent Office  2,995,411
Patented Aug. 8, 1961

2,995,411
TOLL TICKETING DATA HANDLING SYSTEM
Frank A. Morris, Fishers, Howard L. Foote, Fairport, and Gerald R. Paul, Webster, N.Y., assignors to General Dynamics Corporation, Rochester, N.Y., a corporation of Delaware
Filed June 20, 1957, Ser. No. 666,888
10 Claims. (Cl. 346—34)

This invention relates to a data handling system and, more particularly, to a system for storing and recording items of data.

In the copending application of Frank A. Morris et al., Serial No. 348,202, filed April 13, 1953, now Patent No. 2,886,642, there is disclosed an automatic toll ticketing system in which the items of information pertaining to a plurality of toll calls are collected and stored on a length of magnetic tape in a recorder individual to a telephone trunk. This trunk recorder is periodically seized and the data stored on the tape is reproduced and transmitted to a plurality of electronic registers in which it is temporarily stored and used to control the operation of a printer which provides permanent records or printed toll tickets. During the playback or the recording of data stored on the tape, the telephone equipment associated with the seized trunk recorder is busied out with a consequent reduction of the traffic handling capacity of the telephone system. Therefore, it is desirable to reduce the holding or seizure time of the trunk recorder to a minimum by reducing the time required to reproduce, store, and record the data contained on the magnetic tape.

Accordingly, one object of the present invention is to provide new and improved means for handling data items.

Another object is to provide means for electronically storing and recording digital data.

A further object is to provide a data handling system including electronic register means and new and improved means for recording data stored in said register means.

Another object is to provide means for simultaneously transferring data items from a plurality of registers to a recorder therefor.

A further object is to provide new and improved means for reading stored data out of a plurality of registers.

Another object is to provide a data handling system having means for sequentially storing data items in separate registers and means for concurrently transferring stored items from a group of registers to a recorder or utilization device therefor.

Another object is to provide a system including a recorder and a plurality of registers and new and improved control means for sequentially transferring data stored in selected groups of said registers to said recorder.

A further object is to provide a data handling system including both a recorder for simultaneously recording a line entry comprising a group of data items and control means for concurrently supplying groups of items to said recorder in timed succession.

In accordance with these and many other objects, an embodiment of the invention comprises a telephone system including a plurality of trunk recorders, each of which is provided with an endless loop of magnetic tape on which are stored items of information pertaining to toll calls. The successive items are recorded on the tape in the form of mark pulses and are separated by space or control pulses, each group of items pertaining to an individual call being followed by an end-of-call signal. During a playback or recording operation, the trunk recorders are sequentially seized by a playback control circuit so that the mark or data pulses and the space or control pulses are reproduced and transmitted to recording facilities including a plurality of electronic registers each adapted to store one item of information pertaining to a single toll call. A steering in circuit is provided controlled by the space pulses for sequentially enabling each of the electronic registers to receive the following group of mark pulses representing an item of digital data which is to be stored. At the completion of the storage of all of the items of information pertaining to a toll call, the end-of-call signal is transmitted to and received by a printing control circuit to interrupt transmission of additional data until the data stored in the electronic registers is recorded.

Each of the electronic registers includes a group of output devices comprising cold cathode gaseous discharge tubes which are selectively conditioned for operation in accordance with the binary code representation of the digit stored in the connected register. All of the groups of output devices are connected in common to a plurality of translating networks in a decoding circuit in accordance with the tabular position on the record medium at which the stored digit is to be recorded by a recording mechanism capable of simultaneously recording all of the digits comprising a line entry. When the end-of-call code is received by the printing control circuit, a steering out circuit is placed in operation to supply an operating pulse to a first set of the groups of output devices comprising all of the digits forming the first line to be recorded by the recorder, this first set including only a single group of output devices connected to each of the translating networks in the decoding circuit. The application of an operating signal to all of the output devices operates the ones thereof which have been conditioned for operation by its connected register so that signals representing a plurality of digits forming the first line entry are simultaneously transmitted to the decoding circuit to operate the recorder, thereby to produce the concurrent recording of the group of digits forming the first line entry on the record medium. Incident to this recording operation, the recorder transmits an operating signal to the steering out circuit so that a second set of the groups of output devices is supplied with an operating signal, thereby causing the transmission of signals to the decoding circuit representing the second line of digits to be recorded by the recorder.

In this manner, the steering out circuit sequentially renders successive sets of groups of output devices effective to transmit digital data to the decoding circuit and thus to operate the recorder to provide spaced line entries on the record medium. Incident to the recording of the last line entry by the recorder, the steering out circuit restores itself to a normal condition and advises the printing control circuit that the items of information pertaining to the next toll call stored on the magnetic tape in the seized trunk recorder can be transmitted. Further, incident to this operation, the printing control circuit clears all of the electronic registers to a normal condition in which they are capable of receiving the items of information pertaining to the next toll call. Following the completion of the recording of the items of information stored in the seized trunk recorder, the playback control circuit seizes the remaining trunk recorders so that the items of information stored therein are recorded.

Many other objects and advantages of the present invention will become apparent from a consideration of the following detailed description when taken in conjunction with the drawings wherein:

FIG. 10 is a diagram showing the manner in which FIGS. 2–9 of the drawings are placed adjacent each other to form a complete circuit diagram of the present invention.

Figure 1:
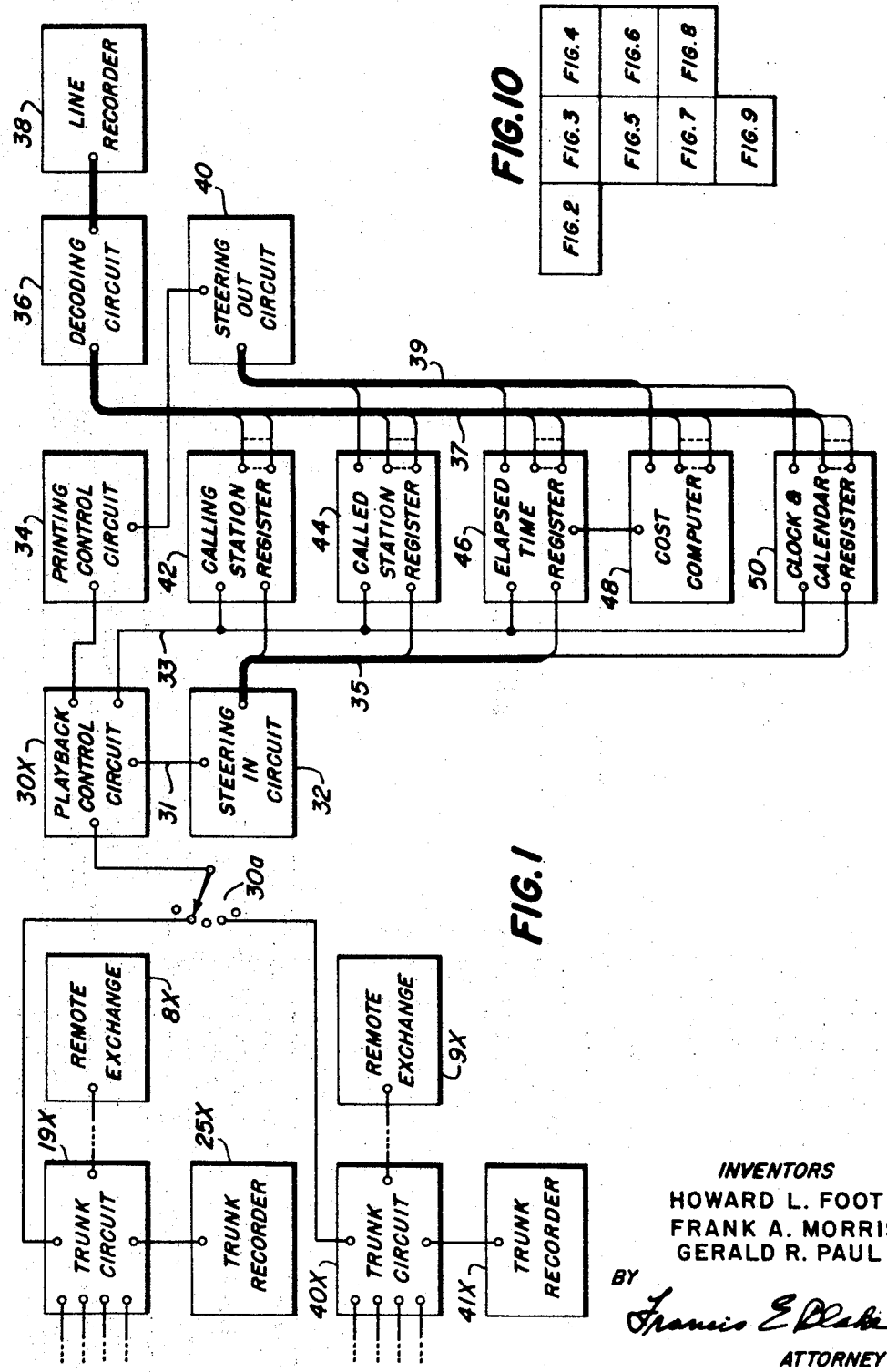
FIG. 1 is a block diagram illustrating the major components of a system embodying the present invention.

Referring now to FIG. 1 of the drawings, therein is disclosed an embodiment of the data handling system of the present invention shown in conjunction with certain components of the automatic toll ticketing system disclosed and described in detail in the above identified Morris et al. patent. The components of the system which are identical to similar circuits in the Morris et al. patent are designated by a reference number followed by the suffix "X". In this prior automatic toll ticketing system, when short or long haul toll calls are to be placed to a pair of remote exchanges 8X and 9X, an access digit is dialed to permit seizure of one of a pair of trunk circuits 19X and 40X terminating trunks extending to the desired remote exchange. Each of the trunk circuits 19X and 40X is provided with an individually connected trunk recorder 25X or 41X in which the items of information pertaining to toll calls placed through the associated trunk circuit are recorded.

The trunk recorders 25X and 41X preferably are of the type disclosed in the copending application of Howard S. Gleason, Serial No. 378,209, filed September 3, 1953, now Patent No. 2,867,435. As disclosed therein, the trunk recorders 25X and 41X each include an endless loop of magnetic tape adjacent to which two transversely spaced transducing heads are disposed to provide two effective channels on the magnetic tape. One of these channels is adapted to receive intelligence or mark pulses, and the other of these channels is adapted to receive control or space signals, the space signals being interposed between consecutive groups of mark pulses to define the effective ends thereof. These trunk recorders include a step-by-step drive mechanism for advancing the magnetic tape step-by-step during recording operations and a selectively controlled continuous drive mechanism for advancing the endless loop of magnetic tape continuously during reproducing or retransmitting operations.

Incident to the seizure of one of the trunk circuits 19X or 40X during the extension of a toll call to one of the remote exchanges 8X and 9X, the trunk circuit 19X, for instance, is conditioned to repeat three dialed digits representing the designation of the calling station to the trunk recorder 25X, each group of mark pulses including a number equal to the value of the dialed digit. Each of three groups of mark pulses is followed by a space pulse indicating the end of the recording of each of these digits. The trunk circuit 19X next transmits three groups of mark pulses representing the three digits of the designation of the called station which are recorded on the mark channel of the magnetic tape together with space pulses representing the end of these three groups of digits. Thereafter, the trunk circuit 19X records a group of mark pulses representing the duration of the toll call in which each pulse represents a one minute increment of elapsed time.

Following the completion of the recording of the elapsed time information, the trunk circuit 19X calls in a common clock and calendar circuit (not shown) which supplies seven groups of mark pulses to the trunk recorder 25X representing the date and time at which the call was placed. These seven groups of mark pulses, each of which is separated by a space pulse, includes two groups representing tens and units hours, two groups representing tens and units minutes, a single group representing months, and two groups representing tens and units days. However, it should be noted that the form in which the mark pulse information is provided by the common clock and calendar circuit differs somewhat from that provided to the trunk recorder 25X representing the designation of the called and calling stations. To provide this latter information, the trunk circuit 19X is directly controlled by dialed digits repeated from the calling substation in which the digit "1" is represented by a single mark pulse and "0" is represented by ten mark pulses. Generally, in the clock and calendar circuit, a single pulse represents "0" and ten pulses represent the digit "9."

Following the completion of the recording of the date and time information in the trunk recorder 25X, the trunk circuit 19X releases the common clock and calendar circuit and records an end-of-call signal on the magnetic tape comprising simultaneously recorded mark and space signals. This end-of-call signal signifies the completion of the recording of all of the items of information pertaining to a toll call. In the event that the call is released prior to the receipt of answering supervisory signals from the calling subscriber in the remote exchange 8X, the trunk circuit 19X records an end-of-call signal on the magnetic tape prior to the recording of the elapsed time information. During the playback of the data stored in the trunk recorder, the receipt of an end-of-call signal prior to the registration of the date and time information signifies that the call was not completed, and the recording facilities discard the previously stored data relating to the designations of the calling and called stations so that permanent records of data pertaining to incomplete calls are not provided. Following the completion of the recording of the end-of-call signal or code, the trunk circuit 19X and the trunk recorder 25X are restored to their normal condition. Since the trunk recorder 25X is capable of storing items of information pertaining to a plurality of toll calls, the trunk circuit 19X operates as described above to record items of information pertaining to each toll call extended therethrough during a given chronological interval.

When the data stored in the trunk recorders 25X and 41X is to be recorded in permanent form, a playback control circuit 30X is placed in operation to advance a stepping switch 30a associated therewith to search for and seize all of the idle trunk circuits together with their associated trunk recorders. When the trunk circuit 19X, for instance, is seized, the transducing heads in the trunk recorder 25X are cut through to the input of the playback control circuit 30X and a control ground is forwarded to the clutch mechanism associated with the continuous drive in the trunk recorder 25X so that the magnetic tape therein is advanced to transmit the items of information pertaining to the first toll call to the playback control circuit 30X. Mark and space pulse amplifying means provided therein receive the reproduced mark and space pulse information and apply the mark pulse signals to a common mark pulse conductor 33 which is connected in common to the inputs of all of a plurality of registers comprising a calling station register 42, a called station register 44, an elapsed time register 46, and a clock and calendar register 50. The space pulses are amplified and applied to a space pulse conductor 31 which is connected to the input of a steering in circuit 32. The steering in circuit 32 comprises a counting chain which provides an enabling potential to an input gate for each of the registers 42, 44, 46 and 50, thereby directing the spaced groups of mark pulses appearing on the mark pulse conductor 33 relating to a single toll call to the proper ones of the above identified registers, thus permitting each group of mark pulses to be stored in a separate electronic register. It should be noted that the recording equipment also includes a cost computer 48 which receives the elapsed time impulses concurrently with the application of these signals to the elapsed time register 46 so as to establish a monetary charge to be assessed for the toll call.

In general, the registers 42, 44, 46 and 50 each comprise a plurality of separate counting circuits each including four binary tube pairs connected as a counting circuit so that the mark pulses sequentially applied to the inputs thereof selectively operate the tubes in the various counters in the registers to patterns of conductive and nonconductive conditions forming binary representations of the values of the entered or stored digits. To provide a means for reading out each of the counters in the registers, an electronic output device or cold cathode discharge tube is provided for each of the binary pairs in each of the counters. The control electrode of each of the output devices is connected to a selected one of the two tubes in each of the binary pairs to receive an enabling potential which is not sufficient to fire the output tube, but which is sufficient to condition this tube for subsequent operation. Accordingly, the conductive pattern provided in each of the counters in each of these registers conditions a group of the associated output devices for being rendered conductive at a subsequent point in the recording operation.

Following the completion of the storage of all of the items of information pertaining to a single toll call in the registers 42, 44, 46 and 50, the end-of-call code is transmitted to a printing control circuit 34 from the playback control circuit 30X. The receipt of this end-of-call code renders the continuous drive mechanism in the trunk recorder 25X ineffective so that the transmission of reproduced data from this recorder is terminated. The receipt of this end-of-call code by the printing control 34 also initiates the readout operation during which the items of information stored in the plurality of electronic registers is recorded on a record medium by a line recorder 38 under the conjoint control of a decoding circuit 36 and a steering out circuit 40.

More specifically, the output or anode electrodes of the groups of output devices are connected in common to the decoding circuit 36 through a cable 37. The decoding circuit 36 includes a plurality of individual transmitting networks operable to convert the binary coded representations afforded by the counters in the electronic registers into one out of ten marking suitable for controlling interposer magnets provided in the line recorder 38. The decoding circuit 36 includes a number of such translating networks which is equal to the greatest number of digits to be simultaneously recorded by the line recorder 38. Accordingly, each of the translating networks is connected in common to all of the registers storing digits which are to appear in the same columnar positions on the record medium.

To provide a means for rendering only the ones of the commonly connected counters effective which store the digits forming a single line entry, the steering out circuit 40 is provided. This circuit comprises an electronic counting chain including a number of counting tubes of the cold cathode discharge type which is equal to the number of lines to be provided on the record medium for each toll call. In response to the receipt of the end-of-call code by the printing control circuit 34, the steering out circuit 40 is operated a single step to supply an operating signal in common to a first set of the groups of output devices. This operating signal renders those of the output devices conductive which previously have been provided with an enabling potential by the connected counters so that signals representing two or more digits are concurrently transmitted to the connected translating circuits in the decoding circuit 36, thereby simultaneously supplying the line recorder 38 with information representing all of the digits forming the first line entry to be recorded. Incident to this recording operation, the line recorder 38 returns a signal to the steering out circuit 40 to operate the counting chain therein to its second position in which operating signals are concurrently applied to all of the groups of output devices in a second set comprising the data which is to be recorded as a second line entry on the registered medium.

In this manner, the steering out circuit 40 is sequentially operated to render different groups of counters in the registers 42, 44, 46 and 50 effective to concurrently supply the digits forming a line entry to the decoding circuit 36. Following the recording of the last line on the record medium, the steering out circuit 40 supplies a control signal to the printing control circuit 34 indicating the completion of the recording of all of the items of information pertaining to the first toll call. The printing control circuit 34 utilizes this signal to reset all of the registers 42, 44, 46, 48 and 50 to a normal condition and to restore the steering out circuit 40 to a normal condition.

The restoration of the registers and the steering out circuit to their normal condition completes the conditioning of the recording equipment for receiving and recording the items of information pertaining to the next toll call. Accordingly, the printing control circuit 34 now advises the playback control circuit 30X that the items of information pertaining to the next toll call can be transmitted to the registers. This intermittent operation continues until such time as all of the items of information stored in the trunk recorder 25X pertaining to complete calls has been recorded by the recorder 38. Thereafter, the playback control circuit 30X advances the switch 30a to seize the next idle trunk circuit and trunk recorder, which may be the trunk circuit 40X and the trunk recorder 41X. The items of information stored in the seized trunk recorder 41X are then recorded by the line recorder 38 and the playback control circuit 30X then operates the switch 30a to seize the next available trunk recorder. Following the completion of the recording of all of the items of information in the trunk recorders to which the switch 30a has access, the recording facilities are returned to their normal condition.

*Storing information in the electronic registers*

Figure 2:
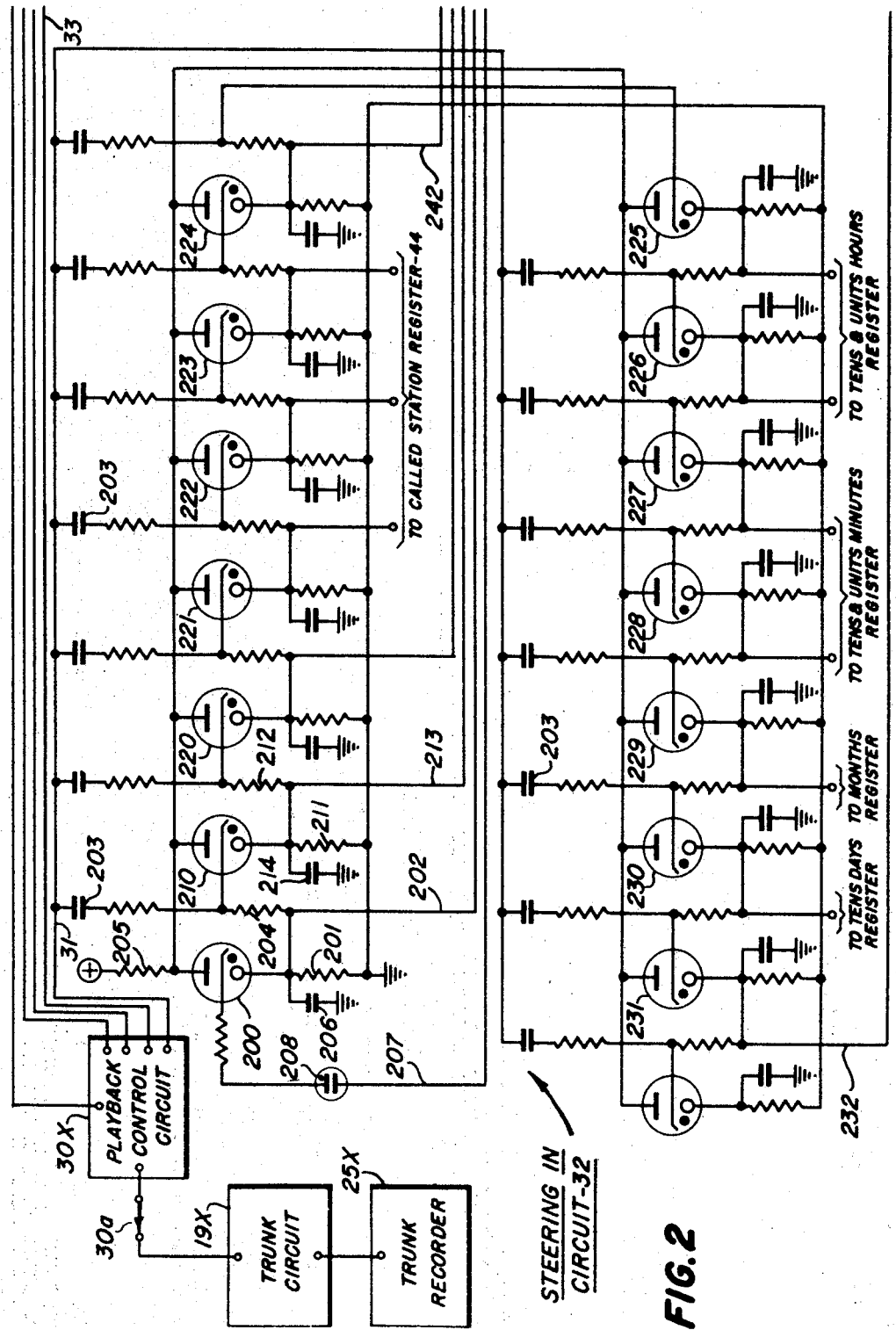
FIG. 2 is a schematic diagram of the steering in circuit.
Figure 3:
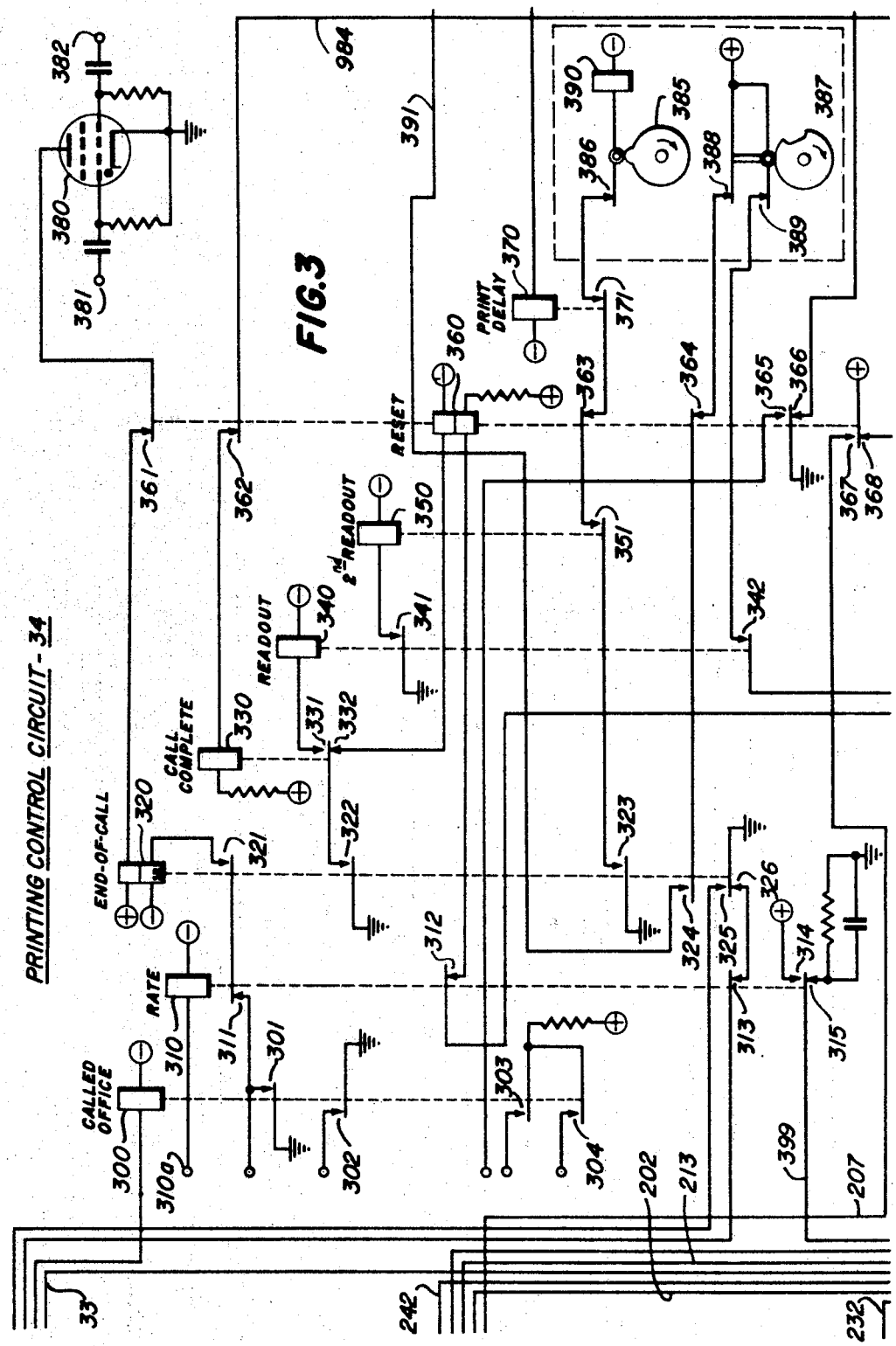
FIG. 3 illustrates a printing control circuit.

Referring now to FIG. 2 of the drawing, therein is shown the steering in circuit 32 which is operated by the space pulses to sequentially render the registers 42, 44, 46 and 50 responsive to different ones of the groups of mark pulses provided on the common mark pulse conductor 33. The steering in circuit 32 generally comprises a counting circuit including a number of cold cathode tubes equal to the number of electronic registers. The counting tubes are individually connected to the inputs of these registers so that the firing of each tube provides a positive enabling potential at the input of one of these registers to render it responsive to the succeeding group of mark pulses appearing on the mark pulse conductor 33.

The counting circuit embodied in the steering in circuit 32 is of the general type disclosed and described in detail in an article entitled "Cold Cathode Counting Circuits" by H. L. Foote, appearing in Communications and Electronics, No. 18, May 1955. The steering in circuit 32 includes a plurality of cold cathode tubes 200, 210, 220 and 221—231 which are connected for sequential operation in the order enumerated to render the electronic registers effective in sequence. The tube 200 is normally primed into a conductive condition so that a positive potential drop appearing across a cathode resistor 201 is extended by a conductor 202 in the cable 35 to the input of a hundreds digit register 500 in the calling station register 42, which register receives the first digit stored on the magnetic tape of a seized trunk recorder. When the first space pulse appears on the space pulse conductor 31 following the seizure of a trunk recorder, such as the trunk recorder 25X, it is coupled through a plurality of condensers 203 to the control electrodes of all of the tubes 210, 220 and 221—231. However, only the control electrode of the second tube 210 in the steering in circuit 32 is provided with a positive enabling potential from the cathode of the normally conductive tube 200 through a series resistor 204. Accordingly, the tube 210 is rendered conductive at this time to produce a positive potential drop across a cathode resistor 211.

The potential across the cathode resistor 211 is forwarded to the control grid of the next succeeding tube 220 in the counting chain through a series resistor 212 and is applied to a conductor 213 extending to the input of a tens digit register 510 in the calling station register 42 which is to store the second digit stored on the magnetic tape in the trunk recorder 25X. Firing the tube 210 increases the potential drop across an anode resistor 205 which is common to all of the tubes in the steering in circuit 32. The increased drop across the anode resistor 205, when considered together with the elevated cathode potential of the tube 200 due to the drop across the cathode resistor 201, is such that conduction no longer can be sustained in the tube 200 and, accordingly, this tube is extinguished to remove the positive potential from the conductor 202, thereby rendering the hundreds digit register 500 in the calling station register 42 nonresponsive to the mark pulses appearing on the mark pulse conductor 33. The cathode resistor 201 of the tube 200 is provided with a shunting condenser 206 which serves to maintain the elevated cathode potential of this tube for an interval sufficient to insure the deionization thereof. Similarly, a condenser 214, which is shunted across the cathode resistor 211, serves to slightly delay the elevation of the cathode potential of this tube so that this tube is not extinguished concurrently with the deionization of the first tube 200 in the steering in circuit 32.

In a similar manner, the space pulses applied to the conductor 31 sequentially energize and extinguish the tubes 220, 221—231 so that a positive enabling potential is supplied to the inputs to the electronic registers in sequence. More specifically, firing the tube 220 provides an enabling potential for a unit digits register 520 in the calling station register 42. The tubes 221, 222 and 223 provide enabling potentials for the hundreds, tens and units counting circuits in the called station register 44. The tube 224 provides an enabling potential for the elapsed time register 46 over a conductor 242, the tubes 225 and 226 provide an enabling potential for the tens and units hours counting chains in the clock and calendar register 50, the tubes 227 and 228 provide an enabling potential for the tens and units minutes counting chains in the clock and calendar register 50, the tube 229 provides an enabling potential for the months counting circuit in the clock and calendar register 50, the tube 230 provides an enabling potential for the tens days counting circuit in the clock and calendar register 50, and the tube 231 provides a positive potential which is forwarded over a conductor 232 to the input of a unit days counter 900 also forming a part of the clock and calendar register 50.

At the end of each cycle of operation of the steering in circuit 32 and following the recording of the items of information stored under the control of the circuit 32, the printing control circuit 34 supplies B+ potential to a conductor 207 which ionizes a neon diode 208 to supply B+ potential to the starting electrode of the first tube 200 in the steering in circuit 32. This ionizes the tube 200 and extinguishes any other ionized tube in the steering in circuit 32, thereby to condition this circuit for operation under the control of the space pulses next applied to the conductor 31.

Figure 5:
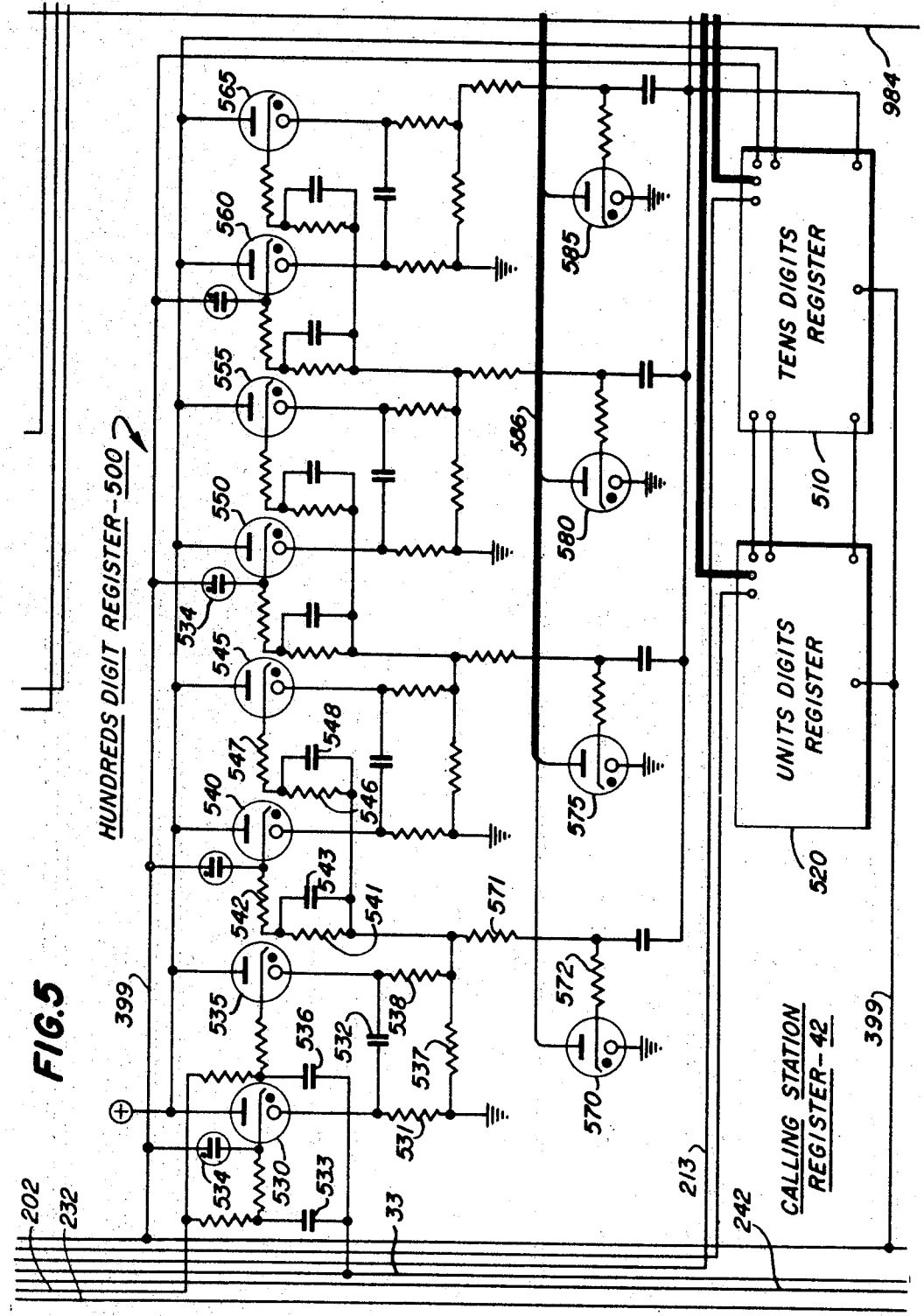
FIG. 5 illustrates a calling station register.

As indicated above, the first item of information pertaining to each telephone call which is stored on the magnetic tape of the seized trunk recorder is the group of three digits forming the designation of the calling station which are to be stored in the calling station register 42 (FIG. 5). The calling station register 42 includes the hundreds digit register 500, the tens digit register 510, and the units digit register 520, the latter two registers being shown in FIGURE 5 in block form. The hundreds digit register 500 is rendered effective to receive the first group of mark pulses applied to the common mark pulse conductor 33 by the ionization of the first tube 200 in the steering in circuit 32 incident to the resetting operation of the recording facilities, and the tens and units digit registers 510 and 520 are sequentially rendered effective to receive the related groups of mark pulses representing the values of these digits under the control of the tubes 210 and 220 in the steering circuit 32, as described in detail above.

In general, the hundreds digit register 500 comprises a counting circuit including four binary pairs of tubes which are interconnected for sequential counting operation under the control of the group of mark pulses applied to the conductor 33 representing the value of the hundreds digit of the designation of the calling station. The counting circuit forming the register 500 is of a type which is also described in detail in the above identified Foote article. In addition, the hundreds digit register 500 includes an output tube individually connected to and controlled by each of the binary pairs which is conditioned for operation in accordance with the conductive pattern forming the binary representation of the value of the stored hundreds digit of the calling station designation. These four output devices are selectively operated under the control of the steering out circuit 40 during a recording operation to concurrently supply a binary coded representation of the value of the stored hundreds digit to a selected one of the translating networks in the decoding circuit 36.

More specifically, the hundreds digit register 500 includes four pairs of cold cathode gaseous discharge tubes 530 and 535, 540 and 545, 550 and 555, and 560 and 565. The even designated tubes 530, 540, 550 and 560 represent the binary digit "0," whereas the odd designated tubes 535, 545, 555 and 565 represent binary digits "1." Since the decimal digit "1" in the calling station information is represented by a single mark pulse, as explained above, the even designated tubes 530, 540, 550 and 560 are primed into a conductive condition incident to resetting the register 500 to its normal condition. In the lowest ordered or input binary pair of tubes 530 and 535, the normally conductive condition of the tube 530 provides a positive potential drop across a cathode resistor 531 so that a cathode coupling condenser 532 is normally charged to this positive potential. When the positive enabling potential is applied to the conductor 202 by the steering in circuit 32, this positive potential is extended to the control electrodes of the tubes 530 and 535 so as to render these two tubes responsive to the first group of mark pulses appearing on the common mark pulse conductor 33 representing the value of the hundreds digit of the calling station designation.

When the first mark pulse is applied to the conductor 33, it is coupled through a pair of input condensers 533 and 536 to the control electrodes of both of the tubes 530 and 535. Since the tube 530 is now in a conductive condition, the tube 535 is ionized to produce a positive potential drop across a pair of series connected cathode resistors 537 and 538. The positive drop across the resistors 537 and 538, together with the potential across the condenser 532, is sufficient to momentarily elevate the cathode potential of the normally conductive binary "0" tube 530 to a point such that conduction no longer can be sustained and, accordingly, this tube is extinguished. With the tube 535 in a conductive condition, the hundreds digit register 500 provides a binary manifestation of the digit "1," when considered in conjunction with the conductive condition of the binary "0" tubes 540, 550 and 560. The firing of the tube 535 also forwards an enabling potential to the control electrodes of the tubes 540 and 545 forming the second order binary pair. More specifically, the positive potential drop across the cathode resistor 537 is coupled through a pair of resistors 541 and 542 to the control electrode of the conductive tube 540 and through a pair of resistors 546 and 547 to the control electrode of the extinguished tube 545. This enabling potential conditions the tubes 540 and 545 for operation.

When the next mark pulse is applied to the conductor 33, it is coupled through the condensers 533 and 536 to the control electrodes of the tubes 530 and 535 in the first binary pair. Since the tube 535 is now in a conductive condition, this mark pulse fires the tube 530 to provide a positive potential drop across the resistor 531. The potential drop across the resistor 531, together with the positive voltage to which the condenser 532 is charged, momentarily elevates the cathode potential of the tube 535 so that this tube is extinguished, thereby restoring the first binary pair to a condition in which the tube 530 is conducting and the tube 535 is extinguished. The momentary elevation of the cathode potential of the tube 535 also momentarily elevates the potential of the junction of the cathode resistors 537 and 538 so that a positive pulse is supplied through a pair of coupling condensers 543 and 548 and the resistors 542 and 547 to the control electrodes of both of the tubes 540 and 545 forming the second binary pair.

Since the tube 540 is in a conductive condition, this positive pulse is effective, when added to the enabling potential previously supplied across the cathode resistor 537, to render the tube 545 conductive. Firing the tube 545 produces a positive potential drop across its cathode resistors which, together with the potential to which the cathode coupling condenser is charged, momentarily elevates the cathode potential of the conductive tube 540 so that this tube is extinguished. Accordingly, with the binary "1" tube 545 in a conductive condition and the binary "0" tubes 530, 550 and 560 in a conductive condition, the conductive pattern in the hundreds digit register 500 provides a binary representation of the decimal digit "2" in accordance with the two mark pulses applied to the mark pulse conductor 33.

The hundreds digit register 500 operates in a similar manner by selectively firing and extinguishing the tubes in the binary pairs forming the register 500 until, at the end of the first group of mark pulses, the first space pulse is applied to the conductor 31 to operate the steering in circuit 32 so that the tube 200 is extinguished and the tube 210 is rendered conductive. Extinguishing the tube 200 removes the positive enabling potential from the conductor 202 so that the input binary pair including the tubes 530 and 535 no longer is responsive to mark pulses appearing on the conductor 33. At this time, the conductive pattern afforded by the conductive and nonconductive conditions of the tubes forming the binary pairs in the hundreds digit register 500 provides a binary representation of the value of the hundreds digit of the calling station designation.

To provide a means for utilizing the digits stored in the register 500, a group of four output devices 570, 575, 580 and 585 is provided. The cathodes of all of these tubes are connected to ground, and the anodes of these tubes are connected over a cable 586 to B+ potential in the decoding circuit 36. The output devices 570, 575, 580 and 585 are selectively conditioned for operation or for being rendered conductive in accordance with the conductive or nonconductive states of the binary "1" tubes 535, 545, 555 and 565 in the hundreds digit register 500. More specifically, the control electrode of each of these tubes is connected to the cathode resistor of one of these binary "1" representing tubes. The control electrode of the output device 570, for instance, is connected to the junction of the cathode resistors 537 and 538 of the tube 535 through a pair of series connected resistors 571 and 572. Accordingly, if the binary "1" tube 535 is in a conductive condition, an enabling potential is forwarded from across the cathode resistor 537 through the resistors 571 and 572 to the control electrode of the tube 570, thereby to condition this tube for operation. In a similar manner, the tubes 545, 555 and 565 control the selective application of an enabling potential to the control electrodes of the output devices 575, 580 and 585, respectively.

In order to provide means for restoring or resetting the hundreds digit register 500 in the calling station register 42 to a normal condition, the control electrode of each of the normally conductive binary "0" tubes 530, 540, 550 and 560 is connected to a reset conductor 399 through a neon diode 534. When the register 500 is to be reset, the printing control circuit 34 applies B+ potential to the conductor 399 which ionizes the neon lamps 534 so that positive potentials are supplied to the control electrodes of all of the tubes 530, 540, 550 and 560, thus rendering any of these tubes which were in a nonconductive state conductive. Rendering the tubes 530, 540, 550 and 560 conductive extinguishes any of the related binary "1" tubes 535, 545, 555 and 565 which were in a conductive state. By thus returning all of the binary "0" tubes to a conductive condition, the hundreds digit register 500 is restored to a conductive pattern representing "0."

As set forth above, at the end of the transmission of the first group of mark pulses representing the value of the hundreds digit of the designation of the calling station, the tube 200 in the steering in circuit 32 is extinguished and the tube 210 therein is rendered conductive to forward a positive enabling potential over the conductor 213 to the input of the tens digit register 510. The tens digit register 510 is identical to the hundreds digit register 500 and operates to receive and store the value of the tens digit of the calling station designation, as determined by the number of mark pulses in the second group thereof. In a similar manner, following the storage of the value of the tens digit in the register 510, the steering circuit 32 is operated by the space pulse following the second group of mark pulses to extinguish the tube 210 and to fire the tube 220, thereby removing the enabling potential from the input to the tens digit register 510 and providing an enabling potential to the input of the units digit register 520. The units digit register 520, which is also identical to the register 500, thereafter receives the third group of mark pulses to store the value of the units digit of the designation of the calling station.

Following the storage of the units digit in the register 520, the steering in circuit 32 operates under the control of the interposed space pulses to render the tubes 221, 222, and 223 conductive in sequence. The cathodes of these tubes are connected to the calling station register 44 and, accordingly, the called station register receives the fourth, fifth and sixth groups of mark pulses applied to the conductor 33 to store the values of the hundreds, tens and units digits of the designation of the called station. The called station register 44 is substantially identical to the calling station register 42 and accordingly, is not illustrated in detail. Following the completion of the storage of the designation of the called station in the register 44, the steering in circuit 32 is operated by the next space pulse to extinguish the tube 223 and to fire the tube 224. Firing the tube 224 extends a positive enabling potential over the conductor 242 to the input of the elapsed time register 46, thereby to condition this register for receiving the next group of mark pulses.

Figure 7:
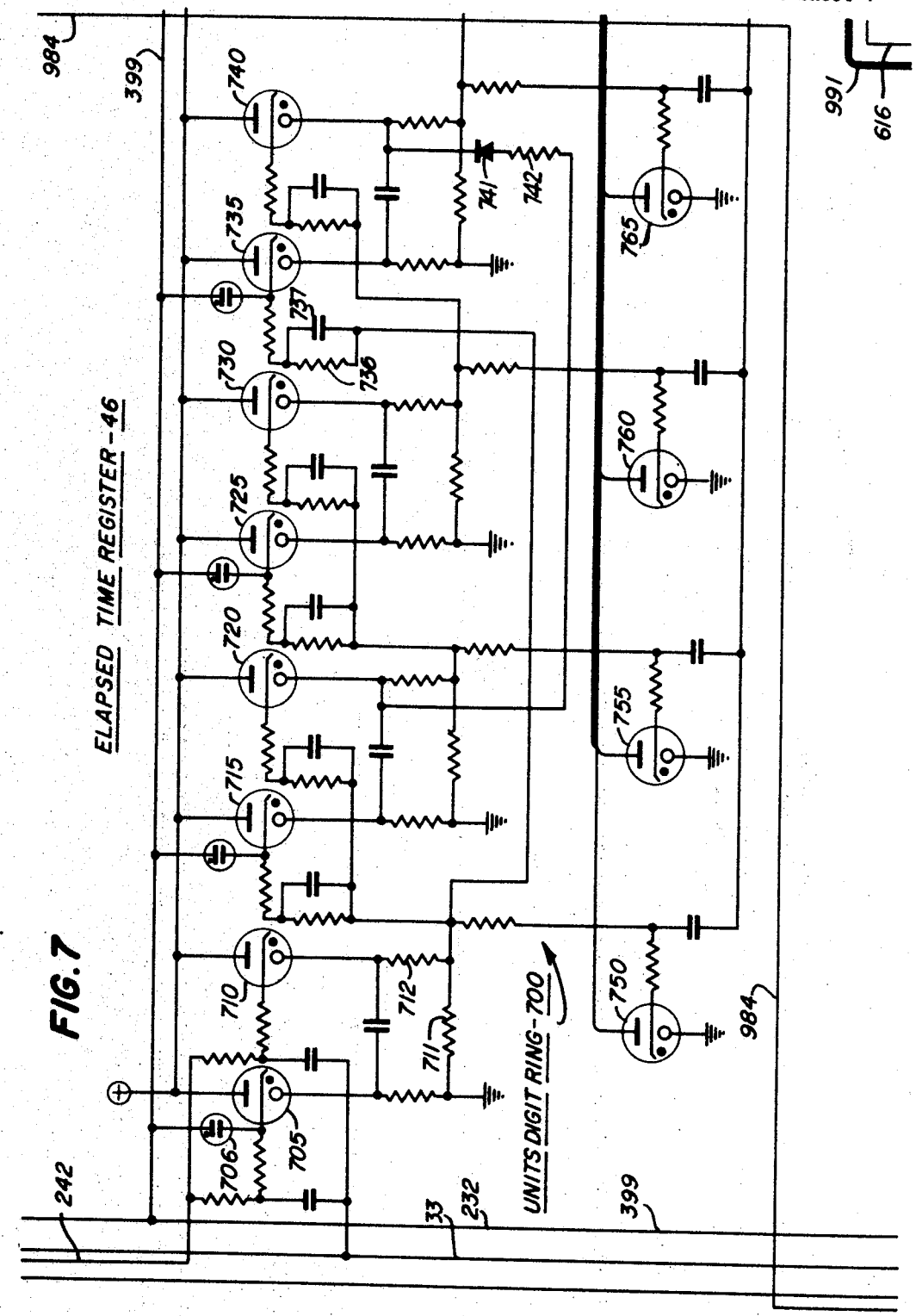
FIGS. 7 and 8 show the circuit of an elapsed time register.
Figure 8:
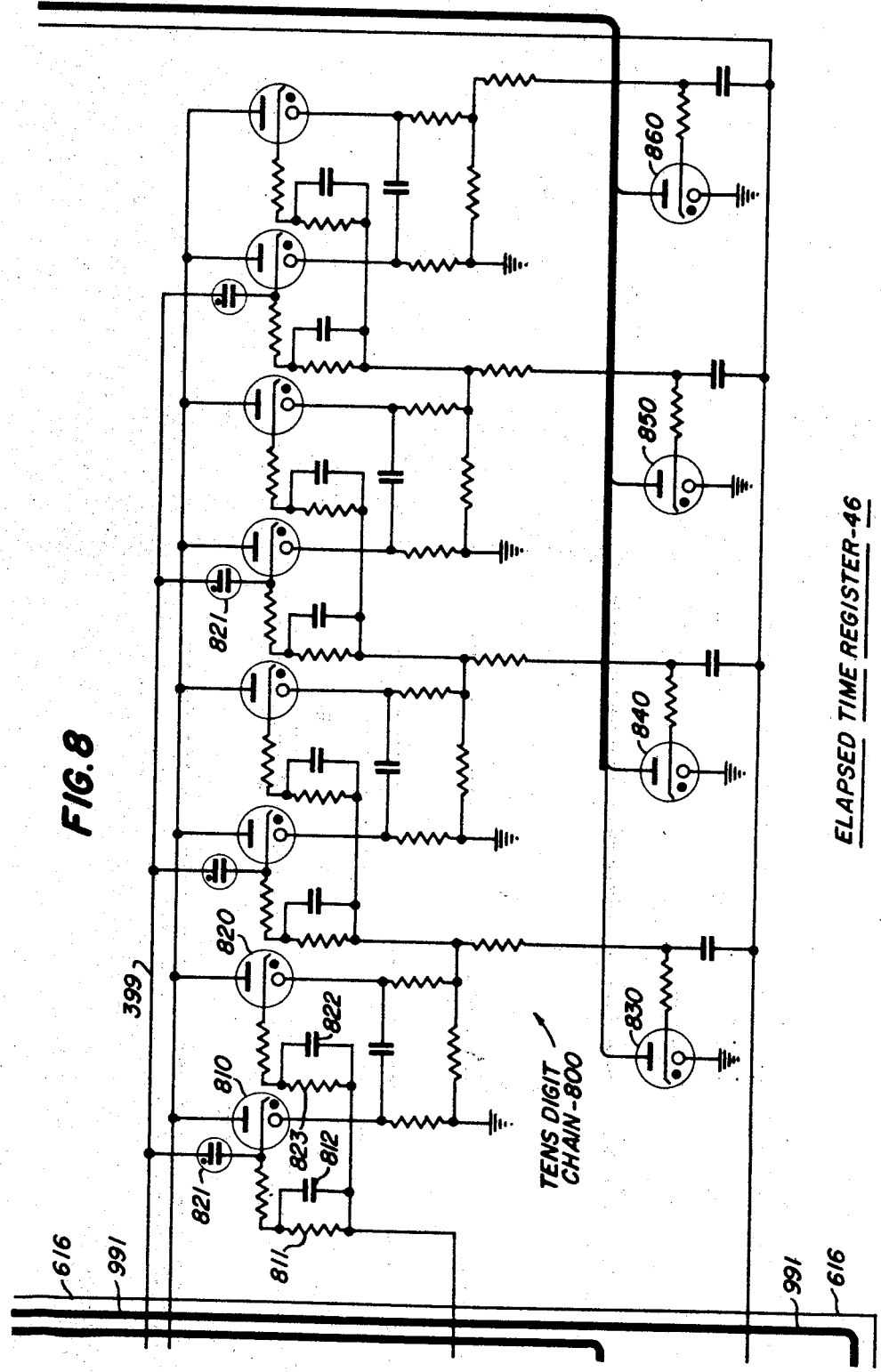
Figure 9:
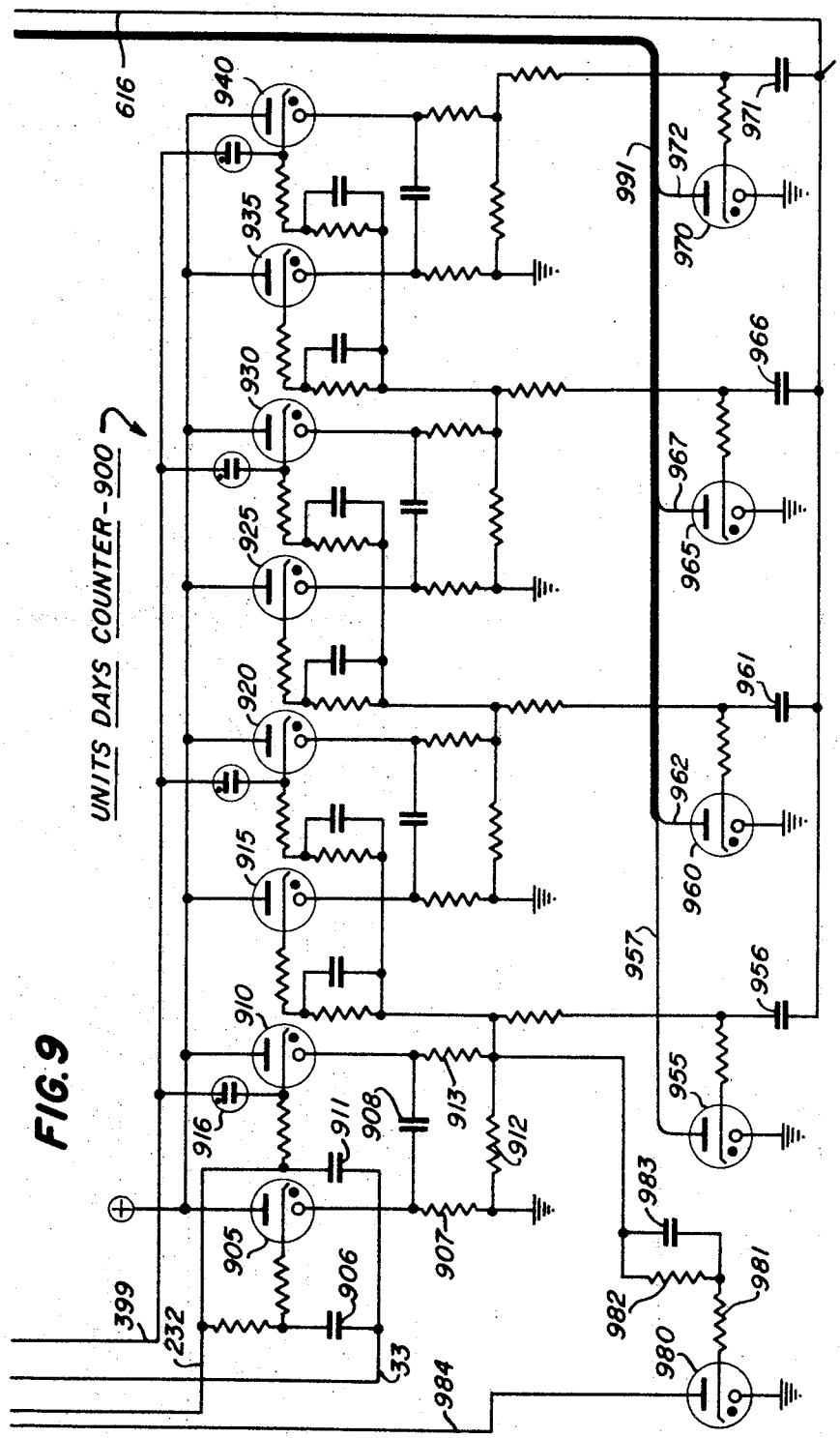
FIG. 9 illustrates a units days counter.

The elapsed time register 46 (FIGS. 7 and 8) includes a units digit counting ring 700 and a tens digit counting chain 800 which are selectively operated under the control of the next group of mark pulses comprising a number of mark pulses equal to the length of the call in minutes. The units digit ring 700 and the tens digit chain 800 are interconnected so that, following the completion of one cycle of operation of the units digit ring 700, an operating pulse is forwarded to the tens digit chain 800 to advance this chain a single step, a cycle of operation of the ring 700 being completed in response to the application of ten mark pulses.

The units digit ring 700 includes four binary pairs of tubes 705 and 710, 715 and 720, 725 and 730, and 735 and 740 which are connected in a manner similar to the four binary tube pairs in the hundreds digit register 500. However, the circuitry of the units digit ring 700 is modified so that the normal binary counting progression is modified to permit a cycle of operation to be completed in response to the application of ten mark pulses. This modification consists in connecting the control electrode of the binary "0" tube 735 in the fourth binary pair to the junction of a pair of cathode resistors 711 and 712 in the cathode circuit of the binary "1" tube 710 in the input or first binary pair. The control electrode of only the binary "1" tube 740 in the fourth binary pair is connected to the cathode circuit of the binary "1" tube 730 in the third binary pair. Further, the cathode of the binary "1" tubes 720 and 740 in the second and fourth binary pairs are connected by a circuit indcluding a normally blocked diode 741 and a series resistor 742.

Accordingly, the units digit ring 700 operates in the same manner as the hundreds digit register 500 until such time as the eighth mark pulse is applied to the input of the ring 700. This eighth mark pulse places the tubes 705, 715 and 725 in a conductive condition and extinguishes the tubes 710, 720 and 730. Extinguishing the tube 730 forwards a positive pulse to the control electrode of the binary "1" tube 740 so that this tube is fired to extinguish the normally conductive tube 735. When the tube 740 is rendered conductive, the diode 741 is biased in its forward direction by the potential drop across the cathode resistor for the tube 740. With the diode 741 biased in its forward direction, the cathode of the tube 715 is placed at substantially the same elevated potential as the cathode of the tube 740.

When the ninth mark pulse is applied to the input of the ring 700, the tube 705 is extinguished and the tube 710 is rendered conductive. Firing the tube 710 produces a positive potential drop across the cathode resistor 711 which is forwarded over a path including a resistance 736 to the control electrode of the binary "0" tube 735 in the fourth binary pair. Thus, when the tenth mark pulse is applied to the input of the ring 700, the tube 705 is rendered conductive and the tube 710 is extinguished by the momentary elevation of its cathode potential. The momentary elevation of its cathode potential supplies a positive pulse through the coupling condenser 737 to the control electrode of the enabled binary "0" tube 735, thereby rendering this tube conductive and consequently extinguishing the binary "1" tube 740. Concurrently, with firing the tube 735, a positive pulse is coupled from the cathode resistance 711 to the tubes 715 and 720 in the second binary pair. At this time, the tube 715 is in conduction and, accordingly, the positive pulse attempts to render the tube 720 conductive. Since the cathode of this tube is maintained at an elevated potential because of the forwardly biased diode 741, the tube 720 is not fired and the tube 715 is not extinguished. When the tube 740 is extinguished incident to firing the binary "0" tube 735, the forward biasing potential for the diode 741 is removed and the tube 720 is rendered responsive to the next positive pulse coupled from the first binary pair. At this time, the tubes 705, 715, 725 and 735 are in a conductive condition providing a binary representation of "0." Further, incident to extinguishing the tube 740, as described above, a positive pulse is coupled to the input of the tens digit chain 800, thereby to advance this chain a single step in response to the completion of a cycle of operation of the units digit counting ring 700.

The tens digit counting chain 800 is substantially identical to the register 500 and comprises four binary tube pairs including an input pair of tubes 810 and 820. The control electrodes of these two tubes are connected by two parallel RC networks including a pair of resistors 811 and 823 and a pair of coupling condensers 812 and 822 to the cathode circuit of the binary "1" tube 740 in the fourth or last stage in the units digit ring 700. When the tube 740 is rendered conductive in response to the application of eight mark pulses to the ring 700, a positive enabling bias is forwarded from the cathode circuit of the tube 740 through the resistors 811 and 823 to the control electrodes of the tubes 810 and 820. When the tube 740 is extinguished in response to the receipt of the tenth mark pulse by the units digit ring 700, the momentary elevation of the cathode potential of the tube 740 provides a positive pulse which is coupled through the condensers 812 and 822 to the control electrodes of the tubes 810 and 820. This extinguishes the normally conductive binary "0" tube 810 and fires the binary "1" tube 820. The tens digit chain 800, in other respects, is identical to the hundreds digit register 500 and operates step-by-step to provide a conductive pattern representing the binary code of the value of the tens digit of elapsed time.

To provide a means for reading out the values of the digits stored in the units digit ring 700 and the tens digit chain 800, a group of four output devices 750, 755, 760, and 765 are provided in the units digit ring 700 and a group of four output devices 830, 840, 850 and 860 are provided in the tens digit chain 800. These output devices are selectively controlled by the binary "1" tubes in the related ring 700 or chain 800 to be conditioned for subsequent operation to transmit the binary code representing the values of the tens and units digits of elapsed time to the decoding circuit 36. Accordingly, the anodes of these output devices are connected to selected ones of the translating networks in the decoding circuit 36 in accordance with the positions on the record medium at which the tens and units elapsed time digits are to be recorded.

To provide a means for resetting the elapsed time register 46 to a "0" condition, the control electrodes of the binary "0" tubes 705, 715, 725, and 735 in the ring 700 are connected to the reset conductor 399 through a plurality of neon lamps 706. Similarly the binary "0" tubes, such as the tube 810, in the tens digit chain 800 are connected to the conductor 399 through a plurality of neon lamps 821. When B+ potential is connected to the conductor 399 by the printing control circuit 34, all of the binary "0" tubes are primed into a conductive condition.

As described in detail in the above identified Morris et al. patent, the cost computer 48 is operated under the control of the elapsed time information concurrently with the operation of the elapsed time register 46. This computer is provided with rate information and with elapsed time information and operates in accordance therewith to determine the monetary charge which is to be assessed for the call. The cost computer 48 comprises counting circuits of the type embodied in the hundreds digit register 500 and the elapsed time register 46 and also includes a plurality of output devices similar to the devices 570, 575, 580 and 585 to provide a means for transmitting binary coded information representing the values of the tens and units dollars digits and the tens and units cents digits of the monetary charge to be assessed for the toll call.

Following the completion of the storage of the elapsed time in the elapsed time register 46 and the accompanying operation of the cost computer 48, the tube 224 in the steering in circuit 32 is extinguished and the tube 225 is rendered conductive. Extinguishing the tube 224 removes the enabling potential from the input to the units digit counting ring 700 so that the elapsed time register 46 is not responsive to the next group of mark pulses appearing on the conductor 33. Firing the tube 225 extends an enabling potential to a tens hours register (not shown) in the clock and calendar register circuit 50 so that the value of the tens hours digit is stored therein. The steering in circuit 32 then sequentially renders the units hours register, the tens and units minutes registers, the months register and the tens days register in the clock and calendar register 50 effective to receive the related groups of mark pulses. Following the completion of the storage of the value of the tens days digit in the clock and calendar register 50, the tube 230 in the steering in circuit 32 is extinguished and the tube 231 is rendered conductive to forward an enabling potential over the conductor 232 to the input of the units days counter or register 900 in the clock and calendar register 50.

The units days counter 900 comprises a binary type counting chain similar to the hundreds digit register 500 and the tens digit counting chain 800, but the sequence of operation thereof is somewhat modified because of the fact that the group of mark pulses representing the value of the units days digit includes only a single pulse representing "0" and ten pulses representing the digit "9." This is in contrast to the above identified registers in which a single mark pulse represents the digit "1" and ten mark pulses represent "0." The units days counter 900 includes four binary pairs of cold cathode tubes 905 and 910, 915 and 920, 925 and 930, and 935 and 940 which are interconnected in a manner identical to the hundreds digit register 500 so that the odd designated tubes represent the binary digit "0" and the even designated tubes represent the binary digit "1." However, since a single mark pulse represents "0," all of the binary "1" tubes 910, 920, 930 and 940 are normally primed into a conductive condition.

Therefore, when the first mark pulse is applied to the conductor 33 following the application of the positive enabling potential to the conductor 232, this pulse is coupled through a pair of input condensers 906 and 911 to the control electrodes of the tubes 905 and 910. Since the tube 910 is normally in a conductive condition to provide a voltage drop across a pair of series connected cathode resistors 912 and 913, the firing of the tube 905 produces a drop across a resistor 907 in its cathode circuit which, together with a potential across a condenser 908 due to the conductive condition of the tube 910, is sufficient to extinguish the tube 910. The momentary elevation of the cathode potential of the tube 910 when it is extinguished couples a positive pulse to the control electrodes of the tubes 915 and 920 forming the second order binary pair, thereby firing the binary "0" tube 915 and extinguishing the binary "1" tube 920. In a similar manner, the tubes 930 and 940 are extinguished and the tubes 925 and 935 are rendered conductive. Accordingly, when the first mark pulse is applied to the input of the units days counter 900, the binary "0" tubes 905, 915, 925 and 935 are rendered conductive and the normally conductive binary "1" tubes 910, 920, 930 and 940 are extinguished. In this condition the counter 900 provides a binary manifestation of "0." Thereafter, the remaining mark pulses in the group of mark pulses representing the value of the units days digit operate the counter 900 in the manner described above in conjunction with the hundreds digit register 500.

To provide a means for reading out the digit entered into the counter 900, a group of four cold cathode output tubes 955, 960, 965 and 970 are provided. The control electrodes of these tubes are each individually connected to one of the tubes in the binary pairs forming the units days counter 900 so that different ones of these tubes are conditioned for subsequent operation in accordance with the pattern of conductive conditions provided by the tubes in the counter 900. The tubes 910, 920, 930 and 940 are primed into their normally conductive state under the control of a plurality of neon diodes 916 connected to the conductor 399.

In addition, the units days counter 900 includes means for advising the printing control circuit 34 as to whether the stored data relates to a complete or an incomplete call. In the event that data relating to an incomplete call is stored in the electronic registers, the printing control circuit 34 prevents operation of the line recorder 38 to record the stored items. Alternatively, if the items of information stored in the electronic registers pertain to a complete call, the printing control circuit 34 initiates operation of the line recorder 38 following the completion of the storage of all of the necessary items in the electronic registers. As set forth above in the description of the storage of the toll call information on the magnetic tape in the trunk recorder 25X, the date and time of placing the call is not supplied by the common clock and calendar circuit to the trunk recorder 25X until after answering supervisory signals have been received from the called subscriber. Accordingly, during the operation of the electronic registers under the control of the steering in circuit 32, the storage of any item of date and time information indicates that the preceding information pertains to a complete call.

To control the provision of call complete information, the cathode circuit of the lowest ordered binary pair including the tubes 905 and 910 controls the selective operation of a call complete tube 980. If this tube is not rendered conductive at the time that the end-of-call code is received, the printing control circuit 34 is advised that data pertains to an incomplete call. Alternatively, if the tube 980 is conducting at the time that the end-of-call code is received by the printing control circuit 34, this circuit is advised that the stored information pertains to a complete call and that a recording operation should be initiated.

More specifically, the control electrode of the call complete tube 980 is connected to the junction of the cathode resistors 912 and 913 by a circuit including a pair of series resistors 981 and 982, the latter of which is shunted by a condenser 983. As described above, the binary "1" tube 910 is normally in a conductive condition so that a positive enabling potential is forwarded to the control electrode of the call complete tube 980 through the series resistances 981 and 982. When the first mark pulse is received by the units days counter 900, thus indicating the presence of date and time information, the tube 910 is extinguished and the tube 905 is rendered conductive, as described above. The momentary increase in the cathode potential of the tube 910 couples a positive pulse through the condenser 983 to the control electrode of the tube 980, thereby firing this tube. Firing the tube 980 completes a conductive path over a conductor 984 and a pair of normally closed contacts 362 to B+ through the operating winding of a call complete relay 330 in the printing control circuit 34. The completion of this circuit operates the call complete relay 330 to close a pair of contacts 331 and to open a pair of contacts 332. The closure of the contacts 331 prepares an operating circuit for a readout relay 340, thereby indicating that the stored items of information are to be recorded. The opening of the contacts 332 interrupts a portion of an operating circuit for a reset relay 360, thereby indicating that the electronic registers are not to be reset prior to the recording operation.

In general, therefore, during the data storing or registering operation, the steering in circuit 32 sequentially renders each of the electronic registers 42, 44, 46 and 56 sequentially effective to receive the groups of mark pulses so that the digital information pertaining to the toll call is stored in binary form in the counting rings and chains. This data is stored in binary form in each of the registers by providing different patterns of conductive tubes. Each binary tube pair in the registers is provided with an individual output device which is conditioned for operation in accordance with whether a binary "0" or binary "1" is stored in the related binary pair. Further, incident to the storage of this information, the printing control circuit 34 is advised by one of the register circuits in the clock and calendar register 50, such as the units days counter 900, whether the stored information pertains to an incomplete call or a complete call, thereby to condition the printing control circuit 34 for initiating either a recording or a reset cycle of operation.

*Recording the stored data*

During the recording cycle of operation, the steering out circuit 40 is operated step-by-step so that different sets of the individual counting circuits forming the registers 42, 44, 46 and 50 are sequentially rendered effective to transmit the stored binary codes therein to the translating networks in the decoding circuit 36, thereby to operate the line recorder 38 to provide spaced line entries including all of the items of information stored in the electronic registers. This operation is initiated at the completion of the storage of all of the items of information pertaining to a single toll call and is terminated in response to the recording of the last line by the recorder 38 under the control of the steering out circuit 40.

More specifically, the end-of-call code comprising simultaneous mark and space pulses is the last item of information transmitted from the seized trunk recorder 25X at the completion of the transmission of the items pertaining to a single toll call. An end-of-call tube 380 is provided in the printing control circuit 34 having one control electrode connected by a terminal 381 to the mark pulse conductor 33 and another control electrode connected by a terminal 382 to the space pulse conductor 31. The application of individual pulses to either one of the control electrodes of the tube 380 is not sufficient to render this tube conductive. However, when a pulse is concurrently applied to both of these control electrodes representing an end-of-call code, the tube 380 is rendered conductive to energize the upper operating winding of an end-of-call relay 320 over a circuit including a pair of normally closed contacts 361.

The operation of the relay 320 closes a plurality of contacts 321, 322, 323, 324 and 325 and opens a pair of contacts 326. The closure of the contacts 321 completes a holding circuit for a lower winding of the relay 320 extending through a pair of normally closed contacts 311 from a pair of contacts 301 which are closed in response to the operation of a called office relay 300. The relay 300 is operated incident to the seizure of the trunk recorder 25X by the playback control circuit 30X, as described in detail in the above identified Morris et al. patent. The operation of the relay 300, in addition to closing the contacts 301, closes a plurality of contacts 302, 303 and 304 to prime rate information into the cost computer 48.

The closure of the contacts 324 extends B+ potential through a pair of normally closed cam controlled contacts 388 and a pair of normally closed contacts 362 to a conductor 391 which extends to the decoding circuit 36, thereby providing an operating potential for the translating networks therein. The opening of the contacts 326 removes ground from a circuit extending through the playback control circuit 30X and the trunk circuit 19X to the trunk recorder 25X to interrupt transmission of additional data from the trunk recorder 25X until the previously stored items have been recorded by the recorder 38. The closure of the contacts 322 completes a circuit either for operating the readout relay 340 to initiate a cycle of recording operation or for operating the reset relay 360 to clear the registers.

As described above, if the call complete relay 330 is not operated to signify the storage of data pertaining to a complete call, the contacts 332 remain closed so that the closure of the contacts 322 completes an obvious operating circuit for a reset relay 360. The operation of the reset relay 360 restores the registers 42, 44, 46, 48 and 50 and the steering in circuit 32 to a normal condition for receiving the items of information pertaining to the next succeeding call stored on the magnetic tape in the seized trunk recorder, as described in detail below. However, if the call complete relay 330 is operated, the closure of the contacts 322 completes an obvious operating circuit for the readout relay 340 so that this relay operates to close a plurality of contacts 341 and 342. The closure of the contacts 341 completes an operating circuit for a second readout relay 350 so that this relay operates to close a pair of contacts 351. The closure of the contacts 351 and the prior closure of the contacts 323 prepares a portion of an operating circuit for a clutch solenoid 390 in the recorder 38.

Figure 6:
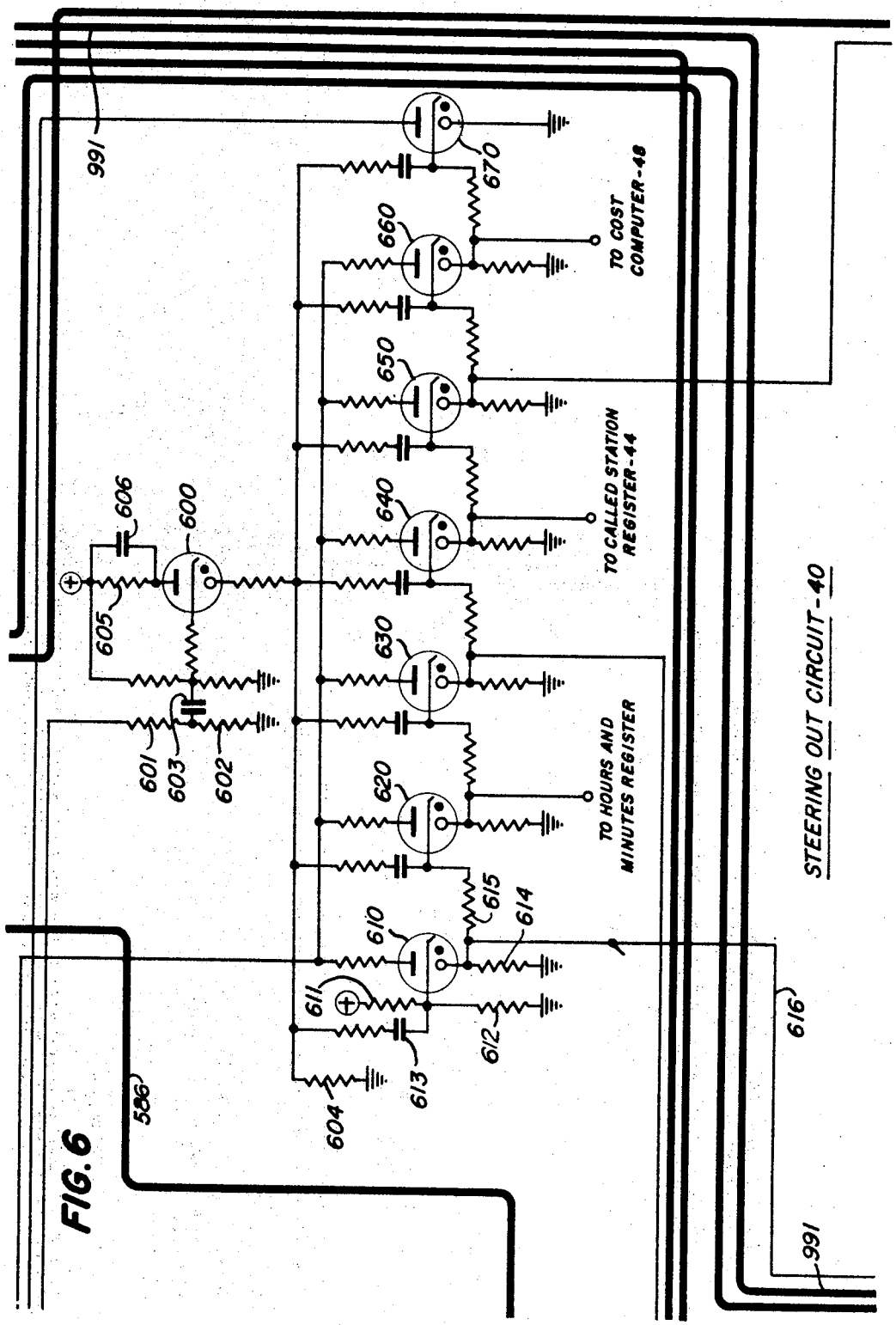
FIG. 6 is a schematic diagram of a steering out circuit.

To initiate step-by-step operation of the steering out circuit 40 (FIG. 6), the closure of the contacts 342 extends B+ from a pair of normally closed and cam controlled contacts 389 to a voltage divider including a pair of series connected resistors 601 and 602, thereby providing a positive pulse which is coupled through a condenser 603 to the input of a drive tube 600 for the steering out circuit 40. The steering out circuit 40 includes a plurality of cold cathode tubes 610, 620, 630, 640, 650, 660 and 670 which are connected for sequential or progressive operation in a manner similar to the steering in circuit 32. The control electrode of the first counting tube 610 in the steering out circuit 40 is provided with a fixed enabling bias by a voltage divider including a pair of resistors 611 and 612 connected between B+ and ground. The remaining tubes in the counting chain derive an enabling potential from the cathode circuit of the next preceding tube in the counting chain.

The control electrode of the drive tube 600 is provided with an enabling potential by a voltage divider connected between B+ and ground so that, when the readout relay 340 is operated to provide a positive pulse through the coupling condenser 603, as described above, the tube 600 is rendered conductive to provide a positive potential drop across a cathode resistor 604. This positive going pulse is simultaneously coupled to the control electrodes of all of the counting tubes in the circuit 40 through a plurality of condensers similar to a condenser 613 connected to the control electrode of the first tube 610 in the counting chain. Since only the control electrode of the tube 610 is provided with an enabling potential, the first pulse provided by firing the drive tube 600 renders only the tube 610 conductive. Following the dissipation of the positive pulse coupled through the condenser 603 and as a result of the potential drops across the cathode resistor of the drive tube 600 and an anode resistor 605 which is shunted by a condenser 606, the drive tube 600 is extinguished by relaxation.

Firing the tube 610 produces a positive potential drop across a cathode resistance 614 which is forwarded through a resistance 615 to the control electrode of the next tube 620 in the chain, thereby conditioning this tube to be rendered conductive. Firing the tube 610 also couples a positive pulse to all of the electronic registers in which are stored the items of information to be recorded in the first line on the record medium by the rerecorder 38. More specifically, assuming that the tens and units months digits and the tens and units days digits are to comprise the first line entry to be recorded by the recorder 38, the cathode of the tube 610 is connected by a conductor 616 to a plurality of coupling condensers connected to the control electrodes of all of the groups of output tubes connected to the registers in which are stored the tens and units months digits and the tens and units days digits.

Referring now more specifically to the clock and calendar register 50 and the units days counter 900 therein, the conductor 616 is connected to a plurality of coupling condensers 956, 961, 966 and 971 which are connected to the control electrodes of the output tubes 955, 960, 965 and 970, respectively. The anodes of these tubes are connected to the operating windings of a plurality of relays 441, 442, 443 and 444 in a fourth column translating network 440 in the decoding circuit 36 by a plurality of conductors 957, 962, 967 and 972, respectively, which form a cable 991. The other terminals of the windings of the relays 441—444 are connected to B+ potential over the conductor 391, and the contacts controlled by these relays control the selective operation of a plurality of interposer solenoids in the recorder 38. These interposers, in turn, selectively control the positioning of a type bar or similar recording mechanism which is effective to record or print data on the record medium in the fourth columnar position thereof. The decoding or translating relays 441—444 translate the binary codes stored in the counters, such as the units days counter 900, into a single marking condition representing a decimal digit.

Assuming that the digit "5" is stored in the counter 900, the binary "1" tubes 910 and 930 and the binary "0" tubes 915 and 935 are in a conductive condition. The conductive conditions of the tubes 910 and 930 supply enabling potentials to the control electrodes of the tubes 955 and 965. Accordingly, when the positive pulse is supplied to the conductor 616 and accordingly, is coupled to the control electrodes of the four output devices 955, 960, 965 and 970 through the coupling condensers 956, 961, 966 and 971, only the tubes 955 and 965 are fired to operate the decoding relays 941 and 943. The selective operation of the relays 941 and 943 extends marking ground to the terminal indicated as "5" in FIG. 4.

To provide means for controlling the recording of the tens and units months digits and the tens days digits of the date in the first, second and third columns of the record medium, the decoding circuit 36 includes three additional translating networks, 410, 420 and 430, each including four translating relays having their operating windings connected to the output devices in the tens and units months registers and the tens days register. Therefore, when the positive signal is applied to the conductor 616 by the steering out circuit 40, it selectively fires the groups of output tubes in these registers so that the binary codes representing these three digits are transmitted to the translating networks 410, 420 and 430. The transmission of these three codes to the networks 410, 420 and 430 selectively operates the four decoding relays in each of these networks so that marking ground is extended to the recorder 38 to control the interposer arrangements in the first, second and third columnar positions to establish conditions representing the values of these three digits. Accordingly, the translating networks 410, 420, 430 and 440 in the decoding circuit 36 simultaneously provide information to the interposer solenoids in the recorder 38 representing the four digits which are to be concurrently recorded as the first line entry on the record medium. The decoding circuit 36 may include additional translating networks, such as a network 450, to provide for the concurrent recording of a greater number of digits.

The decoding circuit 36 also includes means for initiating operation of a main cam roll in the recorder 38 during which the selected type bar or perforating mechanism in each of the columns is rendered effective to record the values of the digits decoded by the networks 410, 420, 430 and 440. More specifically, in response to the operation of any one or more of the relays 441, 442, 443 and 444 in the translating network 440, a path is completed from a pair of normally closed and grounded contacts 366 through both of the plurality of contacts 441a and 443a closed by the operation of the translating relays 941 and 943 to the operating winding of a print delay relay 370, thereby to operate this relay to close a pair of contacts 371.

The closure of the contacts 371 completes an operating circuit for the clutch magnet 390 in the recorder 38, which circuit extends from ground at the closed contacts 323 through the closed contacts 351, 363, 371 and 386. The operation of the clutch magnet 390 engages a clutch so that a main drive roll moves through a single cycle of rotation during which the printing bars are advanced to positions determined by the interposer solenoids selectively operated by the translating networks in the decoding circuit 36 so that selected type characters are aligned in a printing position in accordance with the four digits forming the first line entry. The selectively positioned type bars are then actuated to record the necessary digits and mechanically retracted or returned to their normal position. Further, incident to this cycle of rotation of the main cam roll, a pair of cams 385 and 387 are rotated.

The initial rotation of the cam 385 opens the contacts 386 to release the clutch magnet 390. However, the clutch in the recorder 38 is of a one revolution type which, following engagement, drives the roll or control shaft through a single cycle of rotation irrespective of the continued energization of the clutch solenoid 390.

After a suitable time interval in which the above described recording operations are completed, the cam 387 is rotated to a position in which the contacts 388 and 389 are opened. The opening of the contacts 388 removes B+ potential from the conductor 391 so that the operated translating relays in the translating networks 410, 420, 430, 440 and 450 are released, thereby to condition the decoding circuit 36 for receiving the items of information forming the next line entry on the record medium. The release of the relays in the network 440 interrupts the operating circuit for the relay 370 so that this relay releases to open the contacts 371. The opening of the contacts 371 interrupts the operating circuit for the clutch magnet 390 at an additional point. The opening of the contacts 389 removes B+ potential from the voltage divider including the resistors 601 and 602, but performs no useful function at this time. Further, during the rotation of the cams 385 and 387 the recorder 38 performs a line feed operation to advance an adjacent portion of the record medium to a printing position.

Continuing rotation of the control or cam shaft advances the cam 387 to a position in which the contacts 388 and 389 are again closed. The closure of the contacts 388 again provides B+ potential to the conductor 391 to condition the decoding circuit 36 for operation. The reclosure of the contacts 389 supplies another positive going pulse to the control electrode of the drive tube 600 so that this tube is again momentarily fired to provide a positive going pulse across the cathode resistance 604 which is coupled to the control electrodes of all of the counting tubes in the steering out circuit 40. Since the tube 610 is now in a conductive condition to provide an enabling potential for the tube 620, this tube is fired by the momentary operation of the drive tube 600. Firing the tube 620 couples a positive pulse to all of the groups of electronic output devices connected to the registers in which are stored the four digits forming the second line entry on the record medium.

Figure 4:
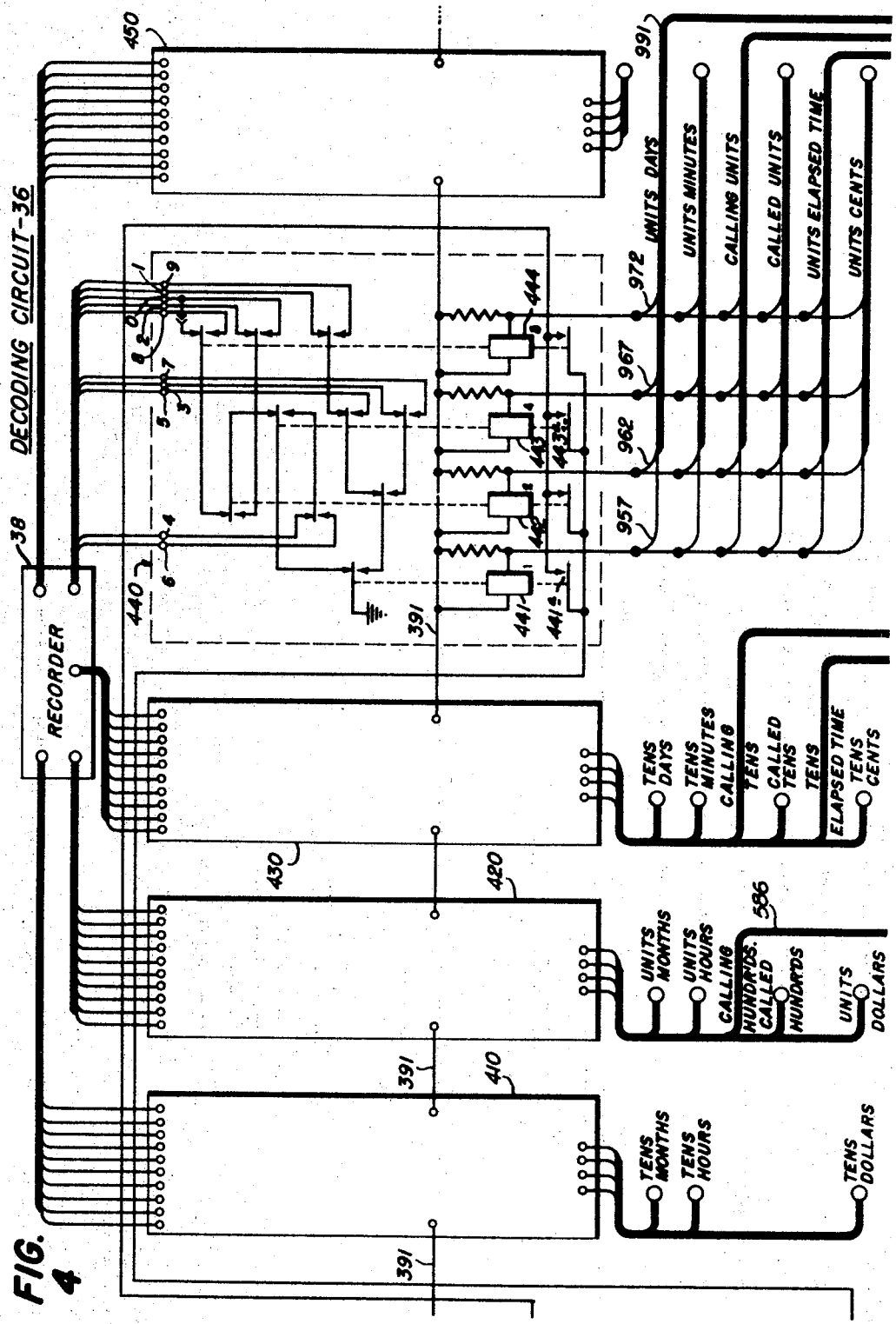
FIG. 4 illustrates, in partial block form, the details of a decoding circuit.

As indicated in FIG. 4 of the drawings, the tens and units hours registers and the tens and units minutes registers in the clock and calendar register 50 provide the four digits which are to form the second spaced line entry on the record medium. Accordingly, the firing of the tube 620 provides a positive operating pulse to the control electrodes of all of the output devices in these four registers or counting chains, thereby rendering conductive the ones of these devices which have been conditioned for operation in accordance with the patterns of conductive conditions afforded in the connected registers representing the values of these stored digits. The selective operation of these output devices operates the translating networks 410, 420, 430 and 440 to extend marking conditions to the interposer solenoids in the recorder 38 representing the values of the four digits to be recorded.

As described above, the selective operation of one or more of the relays 441—444 in the translating network 440 forwards ground to the print delay relay 370 so that this relay is again operated to close the contacts 371. The closure of the contacts 371 completes the above described operating circuit for the clutch magnet 390 so that an additional cycle of rotation of the main control or cam shaft takes place during which the four digits forming the second line entry on the record medium are recorded. Incident to this recording operation, the control cams 385 and 387 are also moved through an additional cycle of rotation in which the clutch magnet 390 is released, the operated relays in the decoding circuit are released, the delay relay 370 is released, and the steering out circuit 40 is pulsed to render the tube 630 conductive.

Rendering the tube 630 conductive provides an operating signal to all of the registers storing the digits forming the third line entry on the record medium. As shown in FIG. 4, this third line entry comprises the designation of the calling station and accordingly, the operation of the tube 630 couples a positive pulse to the control electrodes of the output devices 570, 575, 580 and 585 in the hundreds digit register 500 and to the similar output devices in the tens digit register 510 and the units register 520. The selective operation of these output devices operates selected groups of decoding relays in only the translating networks 420, 430 and 440 to which they are connected. The selective operation of the translating networks again causes the selective operation of the interposer solenoids in the recorder 38 representing the value of these three digits and also forwards ground to the print delay relay 370 so that it operates to again close the contacts 371.

As described above, the closure of the contacts 371 initiates an additional cycle of rotation of the main control shaft during which the cams 385 and 387 are again advanced through a cycle of rotation during which the three selected digits are printed, the recorder 38 is restored to a normal condition, the print delay relay 370 is released, the operated relays in the decoding circuits 36 are released, and the steering out circuit 40 is pulsed so that the tube 640 is rendered conductive.

Rendering the tube 640 conductive supplies an operating pulse to the called station register 44 in which are stored the called hundreds, tens and units digits forming the fourth line entry on the record medium. The transmission of operating signals concurrently to the control electrodes of all of the output devices in the called station register 44 operates the conditioned ones of these devices so that the decoding circuit 36, the recorder 38, and the printing control circuit 34 operate to record the fourth line entry on the record medium, to restore the decoding circuit 36 to a normal condition, and to pulse the steering out circuit 40 so that the tube 650 is rendered conductive.

Firing the tube 650 couples a positive pulse to the control electrodes of all of the output devices 750, 755, 760, 765, 830, 840, 850 and 860 in the elapsed time register 46 so that the stored values of the tens and units digits of elapsed time are transmitted to the decoding circuit 36, thereby to control the recording of these digits on the record medium as the fifth line entry. Thereafter, the decoding circuit 36, the recorder 38 and the printing control circuit 34 cause the recording of these digits, the restoration of the recorder 38 and of the decoding circuit 36 to their normal conditions, and the operation of the steering out circuit 40 so that the tube 660 is rendered conductive to supply a positive readout pulse to the control electrodes of all of the output devices in the cost computer 48. This selective operation of the cost computer 48 transmits the values of the tens and units dollars digits and the tens and units cents digits to the translating networks 410, 420, 430 and 440 in the decoding circuit 36 so that the recorder 38 is operated to record this sixth line entry on the record medium.

Incident to this recording operation, the decoding circuit 36 and the recorder 38 are restored to a normal condition and the printing control circuit 34 is operated to release the print delay relay 370 and to again supply a positive pulse to the drive tube 600 in the steering out circuit 40, thereby firing the tube 670. The firing of the tube 670 is used to initiate a resetting operation in which the printing control circuit 34, the steering out circuit 40, the steering in circuit 32 and all of the electronic registers including the cost computer 48 are restored to a normal condition in which they are capable of receiving the items of information pertaining to the next toll call stored on the magnetic tape in the seized trunk recorder. More specifically, the firing of the tube 670 completes an obvious operating circuit for the lower winding of the reset relay 360, which circuit extends through a pair of normally closed contacts 312. The operation of the reset relay 360 opens the contacts 361, 362, 363, 364, 366 and 368 and closes a plurality of contacts 365 and 367.

The opening of the contacts 363 interrupts the above described circuit for energizing the clutch magnet 390, thereby to prevent further rotation of the main control shaft in the recorder 38. The opening of the contacts 364 interrupts the above described circuit for applying B+ potential to the conductor 391 so that, when the main control shaft completes the cycle of rotation in which the sixth line entry is recorded on the record medium, the decoding circuit 36 cannot be reoperated until the next cycle of recording operation is initiated. The opening of the contacts 366 removes ground from the paths for operating the print delay relay 370. Accordingly, the operation of the reset relay 360 interrupts further operation of the recorder 38 under the control of the decoding circuit 36 and the printing control circuit 34.

The operation of the reset relay 360 also serves to restore the component in the recording facilities to their normal condition. More specifically, the opening of the contacts 361 extinguishes the end-of-call tube 380, but does not release the end-of-call relay 320 inasmuch as the above described holding circuit is completed therefor. The opening of the contacts 362 extinguishes the call complete tube 980 and also releases the call complete relay 330 so that the contacts 331 are opened to cause the sequential release of the first and second readout relays 340 and 350. The closure of the contacts 332 completes a holding circuit extending to the upper winding of the reset relay 360 from the closed contacts 322 on the end-of-call relay 320. The opening of the contacts 368 removes B+ potential from the anodes of the tubes 610, 620, 630, 640, 650 and 660 in the steering out circuit 40 so that all of these tubes are extinguished, the tube 670 remaining conductive over the path extending to B+ potential through the lower operating winding of the reset relay 360.

The closure of the contacts 367 extends B+ potential over the conductor 207 to the neon lamp 208 which is connected to the control electrode of the first tube 200 in the steering in circuit 32, thereby firing this tube. Firing the tube 200 extinguishes any other conductive one of the tubes 210, 220 and 221–231 in the steering in circuit 32, thereby to restore an enabling potential to the conductor 201 which is connected to the input of the hundreds digit register 500. This conditions this register to receive the first group of mark pulses on the magnetic tape pertaining to the next telephone call.

The closure of the contacts 465 extends B+ potential to the cost computer 48 so as to initiate a resetting operation of the cost computer during which the rate information supplied by the operated called office relay 300 is again primed into this computer to condition it for operation under the control of the elapsed time information pertaining to the next call recorded on the magnetic tape. Incident to this resetting operation, the computer 48 returns ground to a terminal 310a, thereby completing an obvious operating circuit for a rate relay 310. The operation of this relay opens the contacts 311, 312, 313 and 315 and closes a pair of contacts 314. The opening of the contacts 311 and 312 interrupts the holding and operating circuits for the end-of-call relay 320 and the reset relay 360 so that these two relays are released. The opening of the contacts 312 further removes anode potential from the tube 670 in the steering out circuit 40 so that this tube is extinguished to restore the steering out circuit 40 to a normal condition. The opening of the contacts 313 further interrupts the path for applying ground to the playback control circuit 30X so that, when the contacts 326 are closed by the release of the end-of-call relay 320, movement of the magnetic tape in the seized trunk recorder is not initiated until such time as all of the resetting operations are completed.

The closure of the contacts 314 applies B+ potential to the conductor 399. The conductor 399 is connected to a plurality of neon diodes or lamps, such as the neon lamps 534 in the hundreds digit register 500, the lamps 706 and 821 in the elapsed time register 46, and the neon lamps 916 in the units days counter 900. These neon lamps are rendered conductive by the B+ potential applied to the conductor 399 so as to prime the proper tubes in the electronic register into a conductive condition.

Following the completion of the resetting of the computer 48, this circuit removes ground from the terminal 310a so that the rate relay 310 is released. The opening of the contacts 314 removes the priming potential from the reset conductor 399, and the closure of the contacts 313 completes a circuit extending from ground at the now closed contacts 326 to the playback control circuit 30X to indicate that movement of the magnetic tape in the seized trunk recorder 25X is to be initiated so that the items of information pertaining to the next toll call can be stored.

During this succeeding operation of the trunk recorder 25X to transmit the items of information pertaining to the next toll call, the recording facilities operate in the manner described above and thus sequentially produce a series of records, each including six spaced line entries including the items of information pertaining to each of the toll calls stored on the seized trunk recorder. Following the completion of the playback or retransmission of all of the data stored in the trunk recorder 25X, the playback control circuit 30X releases the trunk circuit 19X and seizes the next idle trunk circuit so that the items of information stored therein are transmitted to and recorded by the line recorder 38. At the completion of the playback of all of the trunk recorders to which the switch 30a of the playback control circuit 30X has access, the playback control circuit 30X is restored to a normal condition, as described in detail in the above identified Morris et al. patent.

In summary therefore, the data handling and recording system of the present invention provides means for sequentially storing items of information derived from a data source in a plurality of separate electronic registers. The system further includes a line recorder and means for concurrently reading out the digits or data stored in different groups of the electronic registers so that the line recorder 38 is operated to concurrently record a full line entry comprising a plurality of the registered digits. In response to the completion of the recording of all of the stored data in the registers, the registers and the control circuit associated therewith are restored to a normal condition, and the items of information pertaining to the next call are transmitted for storage in these registers.

While the present invention has been described in conjunction with an embodiment thereof adapted for use in storing and recording items of information pertaining to toll calls in an automatic telephone system, it is obvious that the techniques and circuits of the present invention are capable of general application. Further, it is apparent that numerous other modifications and embodiments may be devised by those skilled in the art which will follow within the spirit and scope of the principles of this invention.

What is claimed and desired to be secured by Letters Patent in the United States is:

1. A recording system comprising a plurality of electronic data registers, each of said registers including a plurality of electronic devices operable to different patterns of conductive conditions representing entered data; a source of data signals; a first steering circuit for rendering said source effective to store an item of data in each of said registers in a fixed sequence by selectively operating said registers to conductive patterns in accordance with the data entered; a recorder operable to concurrently record a plurality of said stored data items as a line entry, said recorder including signaling means for supplying an operating signal for each line entry recorded; and a second steering circuit operated by the signals provided by the signaling means in said recorder to concurrently render different groups of said plurality of registers effective to control said recorder in accordance with the different conductive patterns therein.

2. A recording system comprising a plurality of electronic registers selectively operable to different conductive patterns in accordance with entered data items, electronic output means individually connected to each of said registers and controlled by the conductive pattern therein, recording means connected in common to said output means, said recording means including a signaling means operable to supply a control signal incident to each recording operation, a counting circuit including a plurality of series connected electronic devices progressively operable from a normal condition, means responsive to the storage of data items in said electronic registers for conditioning said counting circuit for operation, means controlled by said control signals for periodically operating said counting circuit, and means connecting said electronic devices to said output means to render said output means sequentially effective to control operation of said recording means.

3. The recording system set forth in claim 2 including means controlled by said counting circuit for restoring said counting circuit to said normal condition.

4. A recording system comprising a plurality of electronic registers selectively operable to conductive patterns in accordance with entered data items, electronic output means individually connected to each of said registers and controlled in accordance with the conductive pattern therein, a translating circuit connected in common to all of said electronic output means and controlled thereby, a recorder connected to and controlled by said translating circuit, means connected to said output means for sequentially enabling said output means to control said translating circuit so that said recorder sequentially records the entered data items, and means controlled by said translating circuit for arresting operation of said recorder when an enabled output means fails to operate said translating circuit.

5. A recording system comprising a plurality of digit registers for storing entered digits, each of said registers including a plurality of pairs of electronic devices operable to a pattern of alternate conductive conditions in accordance with the value of an entered digit; a plurality of groups of electronic output devices, each of said groups being connected to and controlled by one of said digit registers in accordance with the pattern therein; a recorder operable to record a number of said entered digits as a line entry; a plurality of translating networks each including a plurality of translating devices, the translating devices in each of the translating networks being continuously connected to a different plurality of said groups of output devices, the translating devices in said translating networks also being continuously connected to said recorder for controlling the operation thereof; and programming means connected to said output devices for sequentially rendering different sets of said plurality of groups of output devices effective to control said translating networks, each of said sets including more than one of said groups but only one group connected to the translating devices in a given one of said translating networks.

6. A recording system comprising a plurality of digit registers for storing entered digits, each of said registers including a plurality of pairs of electronic devices operable to a pattern of alternate conductive conditions in accordance with the value of an entered digit; a plurality of groups of electronic output devices, each of said groups being connected to and controlled by one of said digit registers so that selected ones of the output devices in each of said groups are conditioned for operation in accordance with the pattern in the connected register; a recorder connected to all of said output devices and operable to concurrently record a plurality of said entered digits as a line entry, said recorder also including a signaling means operable to supply a control signal in response to the recording of each line entry; a counting circuit controlled by said control signal and including a plurality of series connected and successively operated elements; means controlled in response to the storage of data in said digit registers for conditioning said counting circuit for operation by said signaling means; and means connecting each of said elements to all of the output devices in different sets of said groups so that the operation of each of said elements supplies an operating signal to all of the output devices in one of the sets connected thereto to operate only the conditioned ones of said output devices, thereby operating said recorder to record the entered digits as a plurality of spaced line entries.

7. A recording system comprising a plurality of digit registers for storing entered digits, each of said registers including a plurality of pairs of electronic devices operable to a pattern of alternate conductive conditions in accordance with the value of an entered digit; a plurality of groups of electronic output devices, each of said groups being connected to and controlled by one of said digit registers so that selected ones of the output devices in each of said groups are conditioned for operation in accordance with the pattern in the connected register; a recorder operable to record a number of said entered digits as a line entry; a plurality of translating networks each connected to a different plurality of said groups of output devices, said translating networks also being connected to said recorder for controlling the operation thereof; a signal generator controlled by said recorder for supplying a signal for each line entry recorded; and control means operated by said signals for sequentially operating the conditioned output devices in different sets of said plurality of groups of output devices, each of said sets including more than one of said groups but only one group connected to a given one of said translating networks.

8. A data handling system comprising a plurality of digit registers each including a plurality of pairs of electronic devices, the electronic devices in each of said pairs being connected for alternate conduction and one of the electronic devices in each pair having an output impedance connected thereto; a plurality of groups of electric output devices each having a control electrode and an output electrode; means connecting the control electrodes of the output devices in each of said groups to the output impedances in a related digit register; input means connected to said digit registers for operating said pairs of electronic devices to patterns of conductive conditions representing a plurality of entered digits so that enabling potentials are supplied to the control electrodes of selected ones of the output devices in said groups of output devices; digit utilizing means connected to the output electrodes of all of said output devices, said digit utilizing means including a signaling means for supplying an operating signal representing each operation of the digit utilizing means; counting means operated by said signaling means and including a plurality of successively operable stages; means controlled by the storage of at least one digit in said plurality of digit registers for conditioning said counting means for operation by said signaling means; and means connecting said stages to the control electrodes of different sets of said output devices so that the enabled output devices in said different sets are rendered conductive to control said digit utilizing means as said counting means is operated by said signaling means, each of said different sets including all of the output devices in more than one of said groups.

9. The data handling system set forth in claim 8 including a plurality of translating networks included in said digit utilizing means and connected between the output electrodes of said output devices and said digit utilizing means, each of said translating networks being connected to the output electrodes of all of the output devices in a plurality of said groups but only one of the groups in each of said different sets.

10. The data handling system set forth in claim 9 including means controlled by said plurality of translating networks for arresting operation of said digit utilizing means when one of said translating networks fails to operate during the successive operations of the stages of said counting means.

References Cited in the file of this patent

UNITED STATES PATENTS

| | | |
|---|---|---|
| 2,297,365 | Ostline | Sept. 29, 1942 |
| 2,301,337 | Sigo | Nov. 10, 1942 |
| 2,428,089 | Mumma et al. | Sept. 30, 1947 |
| 2,594,495 | Retallack | Apr. 29, 1952 |
| 2,595,106 | Scudder | Apr. 29, 1952 |
| 2,655,650 | Marshall | Oct. 13, 1953 |
| 2,667,538 | Wright et al. | Jan. 26, 1954 |
| 2,679,644 | Lippel et al. | May 25, 1954 |
| 2,767,907 | Schwend | Oct. 23, 1956 |